US012810277B2

(12) United States Patent

Huang et al.

(10) Patent No.: US 12,810,277 B2

(45) Date of Patent: Nov. 24, 2026

(54) PAYMENT METHOD, ELECTRONIC DEVICE AND COMPUTER-READABLE STORAGE MEDIUM

(71) Applicant: GUANGDONG OPPO MOBILE TELECOMMUNICATIONS CORP., LTD., Dongguan (CN)

(72) Inventors: Jianhui Huang, Dongguan (CN); Jinze Gao, Dongguan (CN); Libin Zhou, Dongguan (CN); Dingyi Li, Dongguan (CN); Qiming Li, Dongguan (CN); Wei Su, Dongguan (CN); Liang Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 434 days.

(21) Appl. No.: 18/344,407

(22) Filed: Jun. 29, 2023

(65) Prior Publication Data

US 2023/0342749 A1 Oct. 26, 2023

Related U.S. Application Data

(63) Continuation of application No. PCT/CN2021/127877, filed on Nov. 1, 2021.

(30) Foreign Application Priority Data

Dec. 30, 2020 (CN) ......................... 202011630586.1

(51) Int. Cl.
*G06Q 20/32* (2012.01)
*G06Q 20/38* (2012.01)

(52) U.S. Cl.
CPC ..... *G06Q 20/3274* (2013.01); *G06Q 20/3829* (2013.01)

(58) Field of Classification Search
CPC .. G06Q 20/145; G06Q 20/102; G06Q 20/341; G06Q 20/321; G06Q 20/065;
(Continued)

(56) References Cited

U.S. PATENT DOCUMENTS

| | | | |
|---|---|---|---|
| 9,854,426 | B1 | 12/2017 | Wang et al. |
| 10,521,776 | B2 | 12/2019 | Zhou et al. |

(Continued)

FOREIGN PATENT DOCUMENTS

| | | |
|---|---|---|
| CN | 105589336 | 5/2016 |
| CN | 105719138 | 6/2016 |

(Continued)

OTHER PUBLICATIONS

EPO, Extended European Search Report for EP Application No. 21913443.4, May 29, 2024.

(Continued)

*Primary Examiner* — Jason M. Borlinghaus

(74) *Attorney, Agent, or Firm* — Hodgson Russ LLP

(57) ABSTRACT

Provided are a payment method, an electronic device and a non-transitory computer-readable storage medium, the payment method is applied to the electronic device. The electronic device includes a first processor and a second processor. The first processor is configured to run a first system, and the second processor is configured to run a second system, where power consumption of the second processor is lower than power consumption of the first processor. The electronic device is in a second system state in which running of the electronic device is controlled under the second system. The method includes: sending, by the second system, a payment instruction to a first system; receiving a payment graphic code that is generated and returned by the first system according to the payment instruction; and mak-
(Continued)

ing, by the second system, a payment through the received payment graphic code. (FIG. 2)

20 Claims, 6 Drawing Sheets

(58) Field of Classification Search
CPC .... G06Q 20/3224; G06Q 20/34; G06Q 20/32; G06Q 20/325; G06Q 20/326; G06Q 20/327; G06Q 20/367; G06Q 20/10; G06Q 20/108; G06Q 20/3223; G06Q 20/3226; G06Q 20/04; G06Q 20/353; G06Q 20/22; G06Q 20/0658; G06Q 20/24; G06Q 30/0238; G06Q 20/3263
See application file for complete search history.

(56) References Cited

U.S. PATENT DOCUMENTS

| | | | |
|---|---|---|---|
| 2015/0127541 | A1 | 5/2015 | Just et al. |
| 2016/0132369 | A1* | 5/2016 | Lee ........................ G06F 1/3228 713/323 |
| 2017/0076284 | A1* | 3/2017 | Wu ........................ G06Q 20/40 |
| 2017/0193236 | A1 | 7/2017 | Wang et al. |
| 2018/0075442 | A1 | 3/2018 | Tyler et al. |
| 2019/0340601 | A1 | 11/2019 | Wang |

FOREIGN PATENT DOCUMENTS

| | | |
|---|---|---|
| CN | 106527673 | 3/2017 |
| CN | 107798537 | 3/2018 |
| CN | 107909366 | 4/2018 |
| CN | 108305065 | 7/2018 |
| CN | 109118189 | 1/2019 |
| CN | 110413098 | 11/2019 |
| CN | 110908496 | 3/2020 |
| CN | 111314999 | 6/2020 |
| CN | 111932248 | 11/2020 |
| CN | 113159756 | 7/2021 |
| CN | 113392062 | 9/2021 |
| EP | 3291126 | 3/2018 |
| WO | 2018083663 | 5/2018 |

OTHER PUBLICATIONS

CNIPA, First Office Action for CN Application No. 202011630586.1, Jun. 27, 2024.

CNIPA, Second Office Action for CN Application No. 202011630586.1, Feb. 6, 2025.

IPO, Office Action for IN Application No. 202317050502, Apr. 9, 2025.

WIPO, International Search Report and Written Opinion for PCT/CN2021/127877, Feb. 8, 2022.

* cited by examiner

PAYMENT METHOD, ELECTRONIC DEVICE AND COMPUTER-READABLE STORAGE MEDIUM

CROSS-REFERENCE OF RELATED APPLICATIONS

This application is a continuation of International Application PCT/CN2021/127877, filed Nov. 1, 2021, which claims priority to Chinese Patent Application No. 202011630586.1, filed Dec. 30, 2020, the entre disclosures of which are incorporated herein by reference.

TECHNICAL FIELD

The present disclosure relates to the field of communications technologies, and in particular to a payment method, an electronic device, and a non-transitory computer-readable storage medium.

BACKGROUND

Smart wearable devices are becoming more and more popular, especially smart watches and bracelets have been favored by more and more young people. The smart wearable device has not only functions of a traditional watch such as a clock function, but also some functions of other electronic devices, such as a payment function.

However, in a traditional method for payment with a smart wearable device, the payment can be made only through a high-performance system, and is unable to be made under a low-performance system.

SUMMARY

Embodiments of the present disclosure provide a payment method, an electronic device and a non-transitory computer-readable storage medium.

A payment method is provided, which is applied to a wearable device. The wearable device includes a first processor and a second processor. The first processor is configured to run a first system, and the second processor is configured to run a second system. The wearable device is in a second system state in which running of the wearable device is controlled under the second system. Power consumption of the second processor is lower than power consumption of the first processor. The method includes:

- sending, by the second system, a payment instruction to the first system;
- generating, by the first system, a payment graphic code according to the payment instruction, and returning the payment graphic code to the second system; and
- making, by the second system, a payment through the payment graphic code received from the first system.

An electronic device is provided, which includes a memory and at least one processor. The at least one processor is configured to run a first system and a second system thereon, where power consumption required by running of the second system is lower than power consumption required by running of the first system. The memory stores a computer program which, when being executed by the at least one processor, causes the at least one processor to: when the electronic device is in a second system state in which running of the electronic device is controlled under the second system, send, by the second system, a payment instruction to the first system; generate, by the first system, a payment graphic code based on the payment instruction received from the second system, and send the payment graphic code to the second system; and make, by the second system, a payment based on the payment graphic code received from the first system.

A non-transitory computer-readable storage medium is provided, which has a computer program stored thereon. The computer program is capable of being executed by at least one processor. The at least one processor is configured to run a first system and a second system thereon, where power consumption required by running of the second system is lower than power consumption required by running of the first system. The computer program, when being executed by the at least one processor, causes the at least one processor to: when the electronic device is in a second system state in which running of the electronic device is controlled under the second system, send, by the second system, an acquired payment instruction to the first system; generate, by the first system, a payment graphic code in response to receiving the payment instruction, and send the payment graphic code to the second system; and make, by the second system, a payment based on the payment graphic code received from the first system.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to more clearly explain technical solutions of embodiments of the present disclosure or the related art, drawings used in the embodiments or related art will be briefly introduced below. Obviously, the drawings as described below are merely some embodiments of the present disclosure. Based on these drawings, other drawings can be obtained by those skilled in the art without inventive effort.

DETAILED DESCRIPTION OF PREFERRED EMBODIMENTS

In order to make the objectives, technical solutions and advantages of the present disclosure clearer, the present disclosure will be described in detail below with reference to the accompanying drawings and embodiments. It is understandable that the specific embodiments described herein are merely used to explain the present disclosure and are not intended to limit the present disclosure.

It will be understood that the terms "first," "second," and the like, as used in the specification, may be used herein to describe various elements, but these elements are not limited by these terms. These terms are only used to distinguish a first element from another element. For example, without departing from the scope of the disclosure, the first processor may be referred to as a second processor, and the second processor is referred to as a first processor, which are both processors but are not the same processor.

Figure 1:
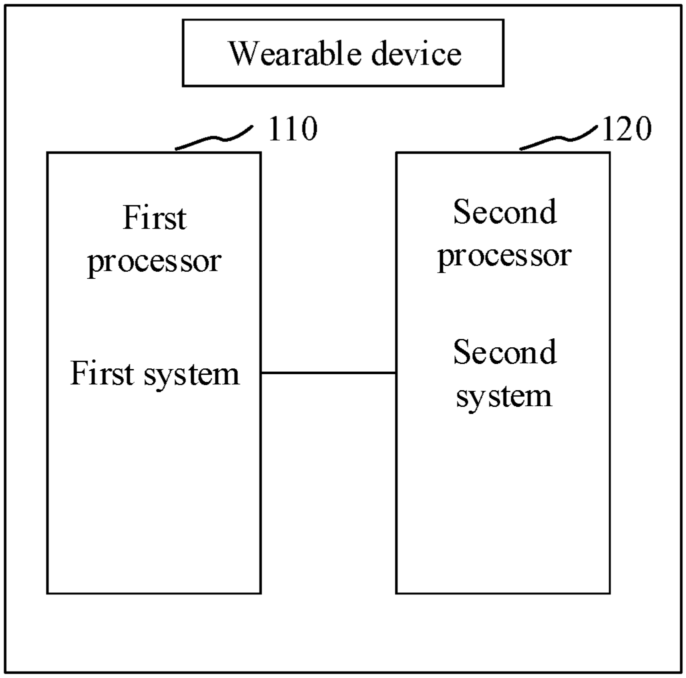
FIG. 1 is a diagram illustrating an application environment to which a payment method according to an embodiment is applied.

FIG. 1 is a diagram illustrating an application environment to which a payment method according to an embodiment is applied. As illustrated in FIG. 1, the application environment includes a wearable device, and the wearable device includes a first processor 110 and a second processor 120. The first processor 110 and the second processor 120 are both microprocessors. The first processor 110 may be used as a main processor, and the second processor 120 may be used as a coprocessor. Each of the first processor 110 and the second processor 120 may be configured as a corresponding microprocessor according to actual applications; for example, the first processor 110 is configured as a Qualcomm processor, and the second processor 120 is configured as an MCU processor, which is not limited herein. The first processor 110 is integrated with an operating system different from the second processor 120. The first processor is configured to run a first system, the second processor is configured to run a second system, and power consumption of the first system integrated into the first processor 110 is higher than power consumption of the second system integrated into the second processor 120. For example, the first processor 110 may be a Central Processing Unit (CPU) processor, and the corresponding first system may be an Android (Android) system. The second processor 120 may be a Microcontroller Unit (MCU) processor, and the corresponding second system may be a Real Time Operating System (RTOS). That is, the wearable device is a dual-core and dual-system electronic device.

The wearable device may be, but is not limited to, a smart watch, a smart bracelet, or the like. The wearable device may include multiple operating states. A first system state means that the first processor controls running of the wearable device and is responsible for logical operations of data, whereas the second processor plays an auxiliary role, and is configured to collect data, such as state data of the user, for provision to the first processor. In the first system state, it may mainly make the first system operate, and the second system is in a sleep state for most of the time; alternatively, the first system and the second system may operate at the same time, for example, the Android system and the RTOS system operate at the same time, which ensures not only basic functions of the wearable device, but also extended functions of the wearable device, being fully functional. A second system state means that the wearable device mainly or only runs the second system, and the running of the wearable device is controlled by the second processor; for example, the Android system is closed, and only the RTOS system is run, which may enable low power consumption and an ultra-long standby time. The main frequency of the CPU may be up to 1.2 GHz (gigahertz), and the main frequency of the MCU is about 320 MHz (megahertz). As such, the power consumption of the first processor is higher than the power consumption of the second processor, and the power consumption of the first system is higher than the power consumption of the second system.

Figure 2:
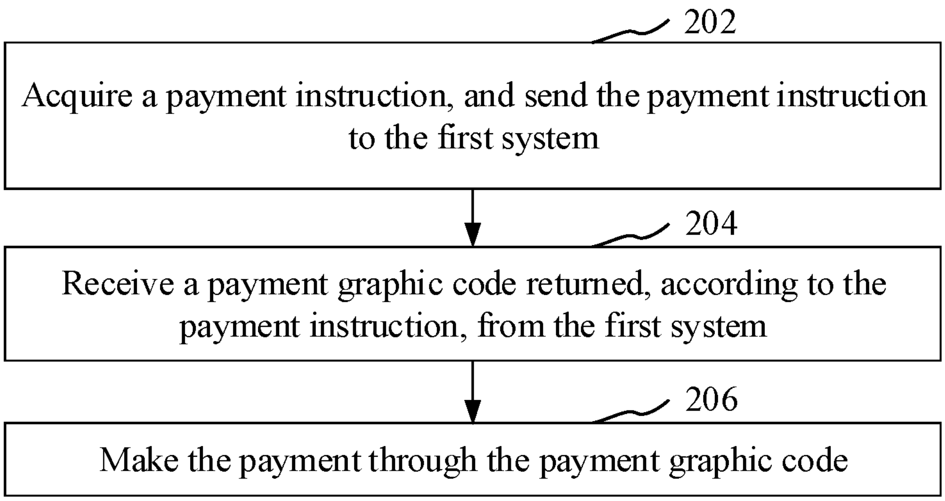
FIG. 2 is a flowchart of a payment method according to an embodiment.

FIG. 2 is a flowchart of a payment method according to an embodiment. The payment method in the embodiment is executed in the second system state, and it is controlled by the second processor. The method includes operations as follows.

Operation 202, a payment instruction is acquired, and the payment instruction sent to the first system.

The wearable device is currently in the second system state, in which state the second processor controls data processing of the wearable device. The wearable device may automatically switch, according to a current operating state, from the first system state to the second system state. For example, upon detecting that the current power of the wearable device is lower than a preset threshold, it automatically switches to the second system state. Alternatively, a user's operation may also be received, and the wearable device is controlled, according to the user's operation, to operate in the second system state. When operating in the second system state, the wearable device implements various functions through a low-performance system, and the power of the wearable device can be saved, which prolongs the standby time. The payment instruction is used to instruct the first system to generate a corresponding payment graphic code. In an embodiment, the payment instruction may carry a timestamp, and according to the timestamp, the first system generates the payment graphic code that dynamically changes over time. Algorithms and forms of generating the payment graphic code are not limited, including but not limited to stacked two-dimensional bar code, or row type two-dimensional bar code, or two-dimensional matrix bar code, or the like.

Specifically, the user's operation is monitored by the second system, and the payment instruction is generated according to a payment operation when the payment operation is monitored, where the payment instruction is an instruction generated when there is a need to make the payment with the graphic code. In an embodiment, the wearable device is an electronic watch, and the payment instruction is generated through an operation performed by the user on a payment interface currently displayed by the electronic watch. The payment operation includes, but is not limited to, a touch operation, a gesture operation, a voice operation, and the like.

Operation 204, a payment graphic code returned, according to the payment instruction, from the first system is received.

The payment graphic code is a graphic code carrying payment information, and it may be in the form of a two-dimensional code or in other forms, where the payment information includes, but is not limited to, a payment account identifier, payment user's identity information, timestamp information, payment running number, and the like.

Making a payment requires generation of the payment graphic code, but the algorithm for generating the payment graphic code is complex, and the second system has limited processing capability Thus, the second system needs to send the payment instruction to the first system, so that the payment graphic code is generated by the first system. Communication between the first system and the second system may perform data exchange through communication between the first processor and the second processor. The first processor and the second processor may communicate with each other through a predefined protocol. In an embodiment, dual-core communication channels perform reliable data transmission between the Qualcomm chip and the MCU chip through a Serial Peripheral Interface (SPI) protocol.

Specifically, the payment graphic code returned, according to the payment instruction, from the first system may be an unencrypted payment graphic code, or may be an encrypted payment graphic code generated after encryption. The first system and the second system may predetermine an encryption algorithm, so that the second system, upon receiving the encrypted payment graphic code, performs correct decryption to obtain the decrypted payment graphic code. The encryption algorithm includes, but is not limited to, a symmetric encryption algorithm, an asymmetric encryption algorithm, and the like.

In an embodiment, an RSA encryption algorithm is used to ensure that the encrypted two-dimensional code data is not stolen, and ensure the security use of the two-dimensional code in the second system state. The RSA encryption algorithm is an asymmetric encryption algorithm through which decryption may be performed without directly transferring the key, this ensures the security of the information and avoids the risk of cracking that would be caused when the key is directly transferred. A pair of keys, referred to as a public key and a private key respectively, are used to perform the encryption and decryption processes, where the private key is stored by one party for decryption, and the public key is sent to another party for encrypting the information.

Operation 206, the payment is made through the payment graphic code.

Specifically, the second system parses the payment graphic code, renders and displays the graphic code on the corresponding payment interface, and information in the payment graphic code is acquired through scanning of a code scanning device, thereby making the payment. In an embodiment, the payment graphic code is transmitted to a payment application, and the payment application renders the payment graphic code with a parsing and rendering module, and displays the payment graphic code on a graphic code presentation interface of the payment application. The subsequent display and payment process may be done by the second system, and the payment function can also be enabled under the low-performance system.

In the embodiment, the payment method is applied to a wearable device, where the wearable device includes a first processor and a second processor. The first processor is configured to run a first system, and the second processor is configured to run a second system. The wearable device is in a second system state, and the power consumption of the second processor is lower than the power consumption of the first processor. A payment instruction is acquired, and the payment instruction is sent to the first system. A payment graphic code returned, according to the payment instruction, from the first system is received, and the payment is made through the payment graphic code. The whole payment process is done in the second system state, and it is controlled by a low power consumption processor. The payment graphic code is received through dual-core communication and is displayed, the payment is done through the low-performance system. In this way, the payment function, which otherwise cannot be realized on the low-performance system, is enabled by means of the high-performance of the first system.

In an embodiment, the payment instruction is configured to wake up the first system, and instruct the first system to generate the payment graphic code according to the payment instruction. And after operation 204, the method further includes: returning response information to the first system, where the response information is used to instruct the first system to enter a sleep state.

Specifically, only when the payment graphic code needs to be generated, the first system is woken up through the payment instruction. After the payment graphic code returned from the first system is received, the first system is instructed to enter the sleep state by returning the response information to the first system. The subsequent display and payment process may be done through the second system, and the first system is in the sleep state; as such, the power consumption of the wearable device is reduced, the payment function can be enabled in a low power state, since the first system is controlled to be in the sleep state for most of the time in the whole payment process.

In the embodiment, the first system is woken up only when the payment graphic code needs to be generated, and the first system enters the sleep state after the payment graphic code is received, thereby further reducing the power consumption of the first system, enabling the payment under a low power consumption condition, and improving resource utilization.

In an embodiment, the returning the response information to the first system includes: performing verification on the payment graphic code, and generating the response information upon determining that the verification is passed.

Specifically, verification is performed on the payment graphic code, and when the verification is passed, the response information is returned to the first system. The payment graphic code may include current verification information, and standard verification information is prestored in the second system. The second system extracts the current verification information from the received payment graphic code, and if no current verification information is extracted, or the extracted current verification information does not match the standard verification information, it indicates that the verification on the payment graphic code fails, or that the payment graphic code may be damaged and anew payment graphic code needs to be requested again from the first system. If the verification is passed, the response information is generated, where the response information is used to notify the first system that a valid payment graphic code has been received, so as to switch the first system to the sleep state, thereby reducing the power consumption.

When the verification fails, a re-transmission notification may be returned to the first system, to cause the first system to regenerate a payment graphic code and return it to the second system. If the payment graphic code is damaged during transmission or the generated payment graphic code is incorrect, the invalid payment graphic code may be detected in the verification, so that the re-transmission notification is returned to the first system device. The re-transmission notification may carry a current time, so that the first system regenerates an updated payment graphic code according to the current time.

In the embodiment, through the verification operation, the validity of the payment graphic code is improved, and payment failure is avoided. Only when the verification is passed, the response information is generated, which further ensures the reliability of the payment graphic code.

Figure 3:
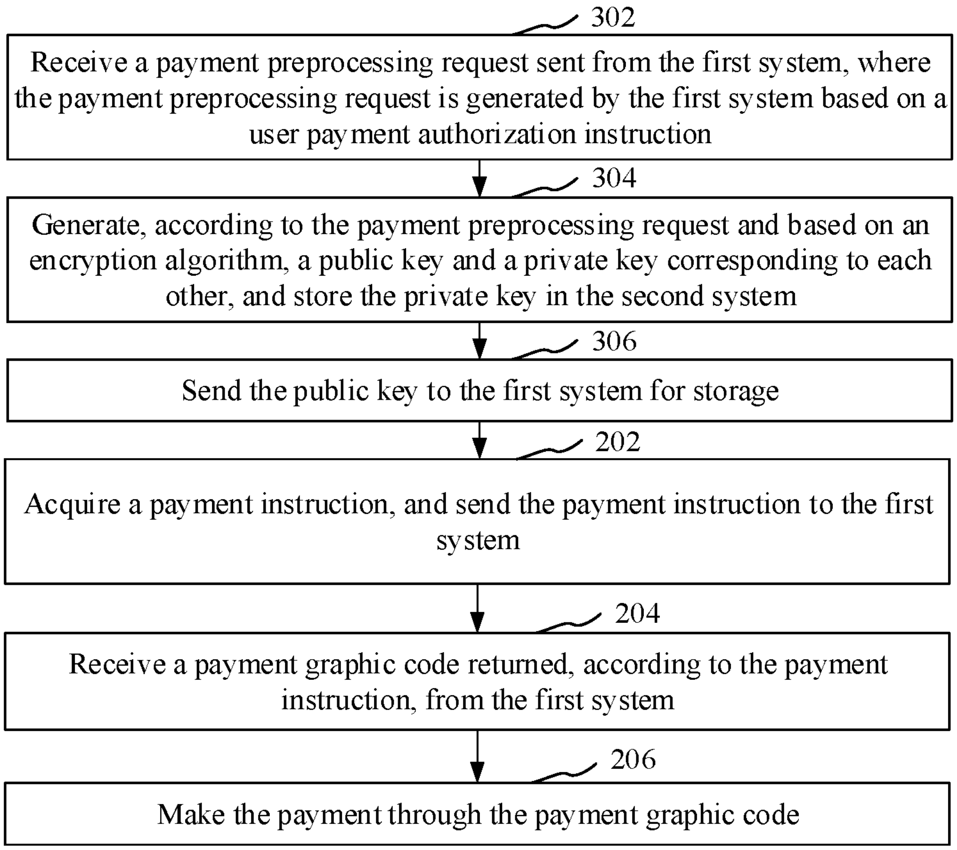
FIG. 3 is a flowchart of a payment method according to another embodiment.

In an embodiment, as illustrated in FIG. 3, before operation 202, the method further includes operations as follows.

Operation 302, a payment preprocessing request is sent from the first system, where the payment preprocessing request is generated by the first system based on a user payment authorization instruction.

The user payment authorization instruction is generated when the user allows a graphic code to be used to make a payment on the wearable device, and it may be generated in the first system state through an operation performed on an authorization setting interface of the wearable device. In the first system state, it may mainly make the first system operate, an authorization setting operation is received through the first system, and the user payment authorization instruction is generated. In an embodiment, the user payment authorization instruction is generated through an operation performed on a user payment authorization key in a pop-up box displayed on an interface of the wearable device.

After the first system acquires the user payment authorization instruction, it indicates that the user allows to pay through the graphic code, the first processor generates the payment preprocessing request and sends it to the second processor. The payment preprocessing request is used to instruct the second processor to generate, based on an encryption algorithm, a public key and a private key corresponding to each other, to ensure secure transmission of the payment graphic code, and ensure payment validity.

Operation 304, a public key and a private key corresponding to each other are generated based on an encryption algorithm according to the payment preprocessing request, and the private key is stored in the second system.

Specifically, in order to ensure secure transmission of the payment graphic code, the second system needs to generate the public key and private key corresponding to each other in advance based on an encryption algorithm. The public key is stored in the first system, for the first system to encrypt the generated payment graphic code with the public key. The private key is stored in the second system, for the second system to decrypt the encrypted payment graphic code received. The algorithm for generating the public key and private key corresponding to each other may be customized. In an embodiment, the public key and the private key are generated through the RSA asymmetric encryption algorithm, where the RSA asymmetric encryption algorithm adopts coprime numbers as large as possible to ensure the high reliability of encryption.

Operation 306, the public key is sent to the first system for storage.

Specifically, the second system sends, through a dual-core communication protocol, the public key to the first system for storage. Channel security is enabled for the delivery of the generated public key by means of the reliable dual-core communication, so that the overall reliability of the payment graphic code can be achieved.

In the embodiment, after it is confirmed that the user allows to use the wearable device to pay through a graphic code, the first system instructs the second system to generate a public key and a private key based on an encryption algorithm, and send the public key to the first system through dual-core communication. The first system stores the public key after receiving it, and waits for a graphic code payment instruction sent from the second system. The security of subsequent transmission of the payment graphic code is ensured by generating the public key and the private key in advance, which improves the reliability of payment.

In an embodiment, operation 204 includes: receiving an encrypted payment graphic code that is encrypted by the first system with the public key; and decrypting the encrypted payment graphic code with the private key, to obtain the payment graphic code.

Specifically, the second system decrypts the encrypted payment graphic code by using the private key, to obtain the decrypted payment graphic code. Only the private key can enable the decryption to be successful, so that the payment graphic code can be used, thereby improving the transmission security of the payment graphic code.

In the embodiment, the public key is transmitted to the first system from the second system, and the encrypted payment graphic code is transmitted to the second system from the first system. In this case, even if both of the encrypted payment graphic code and the public key are intercepted by a hacker, there is no danger, because only the private key of the second system can decrypt the message, thereby preventing leakage of contents of the message.

In an embodiment, operation 206 includes: transferring the payment graphic code to a user interface, and displaying the payment graphic code on the user interface.

Specifically, the second system sends the payment graphic code to a UI user interface for parsing and display, so that the payment may be done through graphic code in a low power consumption mode. In an embodiment, a display screen of the wearable device is connected to the first processor and the second processor through a Mobile Industry Processor Interface (MIPI), and may display the data output by the first processor or the second processor. The data analysis and display of the graphic code are performed by the low-power processor, i.e., the second processor, which reduces the power consumption of the wearable device.

In the embodiment, in the second system state, the payment graphic code may be displayed through the low-performance system, which ensures the use of the payment function of the wearable device under the low-performance system, and reduces the power consumption of the wearable device.

In an embodiment, the method further includes: detecting an operating state of the wearable device; and upon determining that the operating state meets a low power consumption condition, switching the wearable device to operate in the second system state, and controlling the first system to enter the sleep state.

Specifically, the operating state of the wearable device includes a device state of the wearable device itself, and may further include a user state collected by the wearable device. The device state includes a state of charge, a device temperature state, a device motion state, and the like. The state of charge includes a low power state and a high power state. The device temperature state includes a normal temperature state and an abnormal temperature state. The device motion state includes a device motion speed, a device rotation angle, and the like. The user state includes at least one of a heart rate, attention information (such as eyeball position information), and cardiopulmonary data of the user, but is not limited thereto. The low power consumption condition may be customized; for example, the low power state, the abnormal temperature state, a state where the motion speed of the device is greater than a preset threshold, a state where the heart rate is lower than a preset threshold, and the like, may all be considered as meeting the low power consumption condition.

In an embodiment, a state vector is defined by various states in the device state and the user state, and it is determined, based on the state vector, whether the low power consumption condition is met. For example, a standard state vector corresponding to the low power consumption condition is preset, and matching is performed between the current state vector defined by various states of the wearable device and the standard state vector; and if the matching is successful, it is considered that the low power consumption condition is met. It may be flexibly determined, according to settings for various states of the wearable device, whether the wearable device meets the low power consumption condition or not, so that the wearable device is accordingly switched to operate in the second system state, and the first system is controlled to enter the sleep state, which reduces the power consumption.

In the embodiment, the operating state of the wearable device is automatically detected; and upon determining that the operating state meets the low power consumption condition, the wearable device is automatically switched to operate in the second system state, and the first system is controlled to enter the sleep state, thereby reducing the power consumption.

Figure 4:
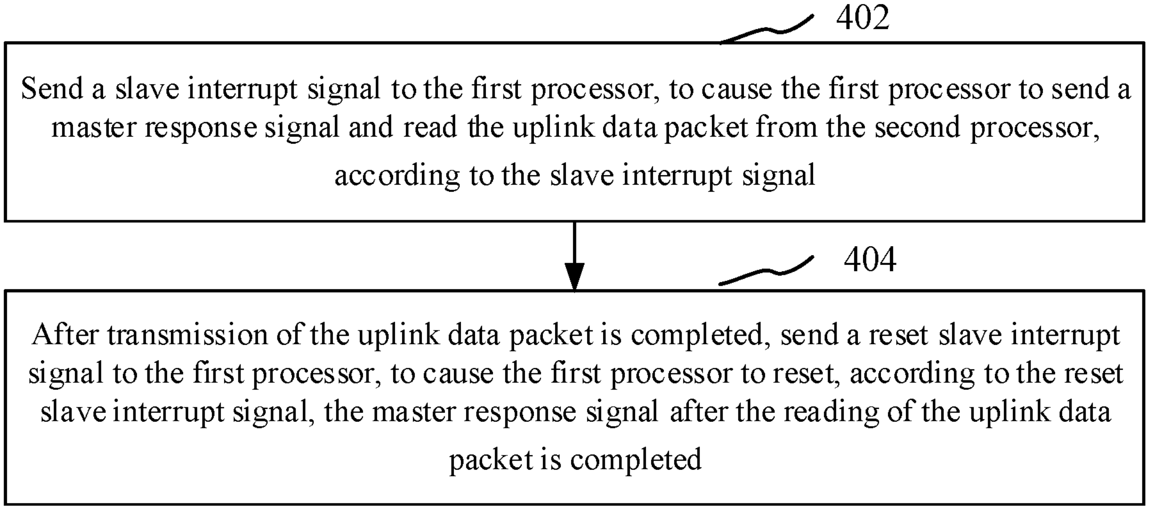
FIG. 4 is a flowchart of uplink data packet transmission according to an embodiment.

In an embodiment, an uplink data packet is transmitted from the second processor to the first processor. As illustrated in FIG. 4, the second processor transmitting the uplink data packet to the first processor includes operations as follows.

Operation 402, a first slave interrupt signal is sent to the first processor, to cause the first processor to send a first master response signal and read the uplink data packet from the second processor, according to the first slave interrupt signal.

The uplink data packet may include at least one of an operation instruction and service data that are received or generated by the second processor. For example, the uplink data packet may be the payment instruction acquired by the second system, the response information generated after receipt of the payment graphic code, the public key generated based on the encryption algorithm, and the like.

The first slave interrupt signal is used to force an interruption and indicate that there are some uplink data needed to be transmitted from the second processor to the first processor. Specifically, upon detecting that there is an uplink data packet, the second processor of the wearable device may generate a corresponding first slave interrupt signal according to the uplink data packet, and send the generated first slave interrupt signal to the first processor through a slave interrupt interface after locking a data transmission interface.

According to the first slave interrupt signal, the first processor may read the uplink data packet from the second processor, and send the first master response signal to the second processor. The first master response signal is used to indicate that the first processor is in a data transmission state.

Operation 404, after transmission of the uplink data packet is completed, a second slave interrupt signal is sent to the first processor, to cause the first processor to generate, according to the second slave interrupt signal, a second master response signal after the reading of the uplink data packet is completed. In some embodiments, the second slave interrupt signal may be obtained by resetting the first slave interrupt signal, and the second master response signal may be obtained by resetting the first master response signal.

Specifically, the second processor may generate the second slave interrupt signal, after the transmission of the uplink data packet is completed. The first processor may receive the second slave interrupt signal. The second slave interrupt signal may indicate that the second processor has completed the transmission of data. The first processor may generate the second master response signal when obtaining the second slave interrupt signal.

In the foregoing embodiment, the first processor may read the data packet upon receiving the first slave interrupt signal; and after the reading of data is completed, the first processor may generate the second master response signal according to the second slave interrupt signal that is generated by the second processor, where the second master response signal indicates that single data transmission has been completed. This reduces the delay of communication between the processors, and improves the communication efficiency of the processors.

Figure 5:
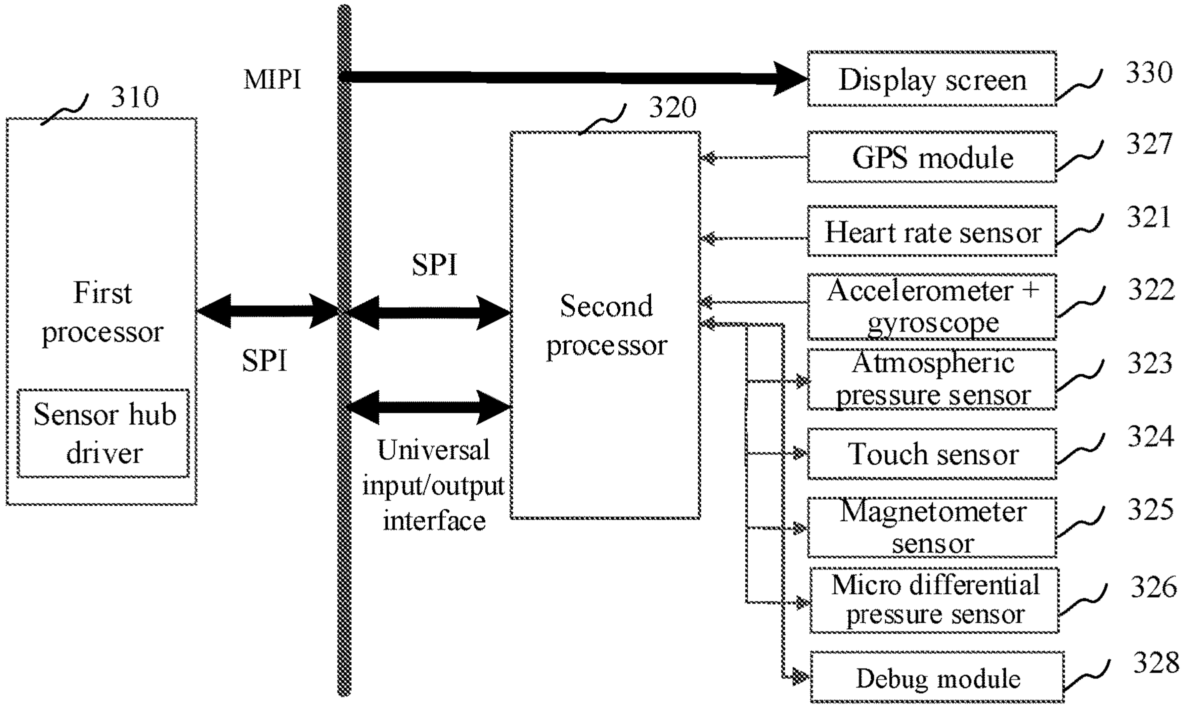
FIG. 5 is a schematic diagram illustrating an internal structure of a wearable device according to an embodiment.

Specifically, as illustrated in FIG. 5, it is a schematic diagram illustrating an internal structure of the wearable device according to an embodiment. The wearable device includes a first processor 310 corresponding to the first system and a second processor 320 corresponding to the second system. The wearable device may include one or more of a heart rate sensor 321, an accelerometer+gyroscope 322, an atmospheric pressure sensor 323, a touch sensor 324, a magnetometer sensor 325, and a micro differential pressure sensor 326. The second processor 320 may be connected to the sensor(s) included in the wearable device, and configured to acquire data collected by the sensor(s). The second processor 320 may be further connected to a Global Positioning System (GPS) module 327, and be configured to acquire positioning data received by a GPS antenna. The second processor 320 may be further connected to a debug (DEBUG) module 328, and be configured to output debugging data of the wearable device. The first processor 310 and the second processor 320 are connected through a Serial Peripheral Interface (SPI), so that the first system and the second system may transmit communication data through the SPI bus. The display screen 330 is connected to the first processor 310 and the second processor 320 through a Mobile Industry Processor Interface (MIPI), and may display data output by the first processor 310 or the second processor 320. The first processor 310 further includes a sensor hub driver which may be configured to drive data collection and processing of various sensors.

Figure 6:
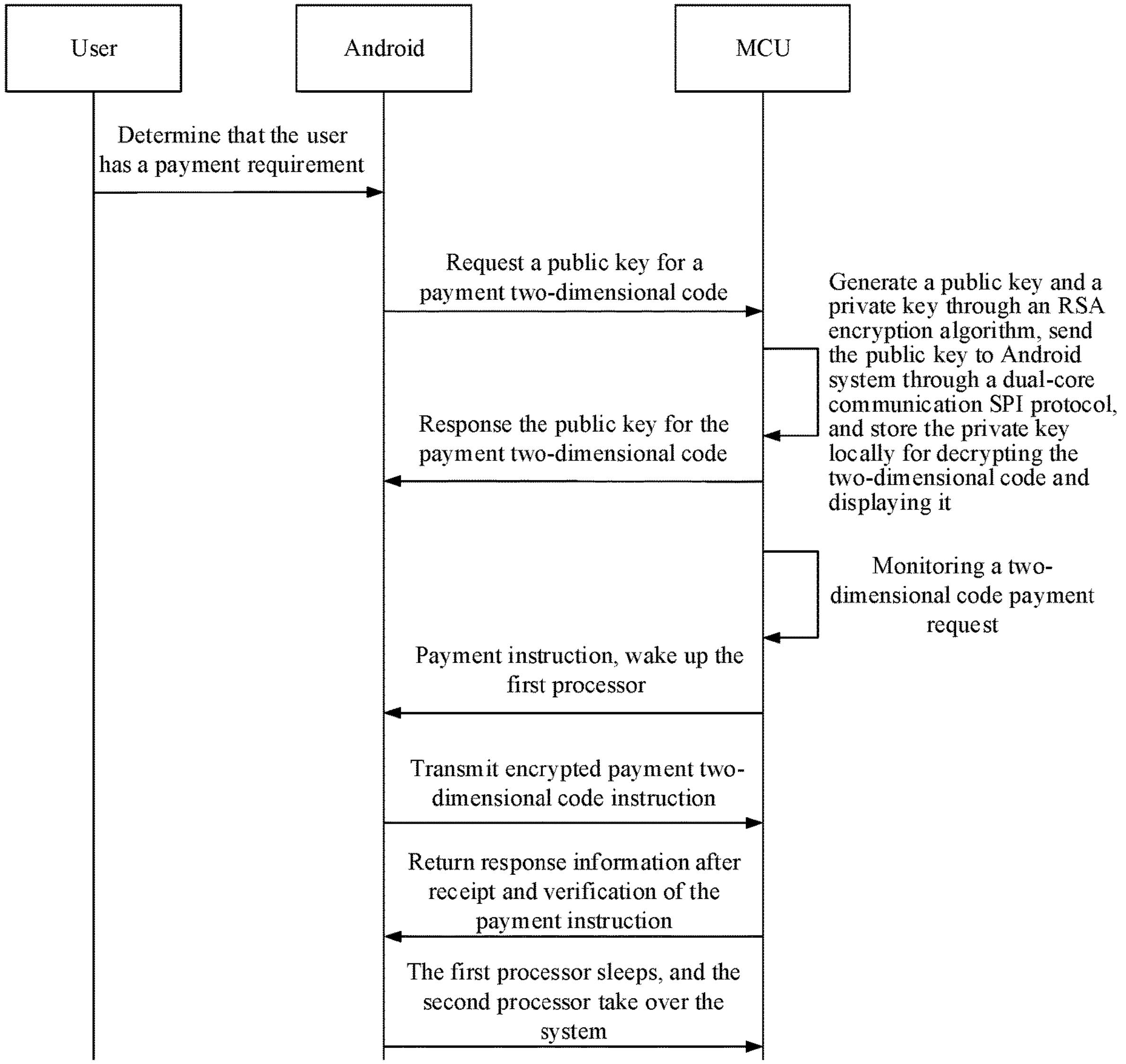
FIG. 6 is a schematic diagram illustrating interaction of a payment method according to a specific embodiment.

In a specific embodiment, as illustrated in FIG. 6, the first processor 310 is a Qualcomm chip on which the Android system is run, the second processor 320 is an MCU chip on which the RTOS system is run, and the payment method includes operations as follow.

1. The Android system receives a two-dimensional code payment authorization operation performed on an interface, determines that the user has a payment requirement, and generates a payment preprocessing request.

2. The Android system sends the payment preprocessing request to the MCU. The MCU generates a public key and a private key by using the RSA encryption algorithm, sends the public key to the Android system through a dual-core communication SPI protocol, and stores the private key locally for decrypting the two-dimensional code and displaying it.

3. The Android system stores the public key after receiving it, and waits for the MCU to send a two-dimensional code payment instruction.

4. The MCU monitors a payment action of the user in a low power consumption state, and sends the payment instruction to the Android system to wake up the Android system, upon monitoring a two-dimensional code payment request.

5. Upon receiving the payment instruction, the Android system is waked up to generate a two-dimensional code, and encrypt the generated two-dimensional code with the prestored public key.

6. The Android system transmits the encrypted two-dimensional code to the MCU through the dual-core communication SPI protocol.

7. After receiving data responsive to the payment instruction, the MCU obtains two-dimensional code data through decryption with the private key of the MCU itself, and returns, to the Android system, response information to instruct the Android system to enter the sleep state.

8. The MCU sends the two-dimensional code data to the UI for parsing and display, and two-dimensional code payment is made in the low-performance system.

In the embodiment, dual-core communication channels perform reliable data transmission between the Qualcomm chip and the MCU chip through the SPI protocol, and the RSA encryption algorithm is used to protect the encrypted two-dimensional code data from been stolen. This ensures the security use of the two-dimensional code in the low power consumption mode under the low-performance system. In addition, by using the high performance and multiple functions supported by the Android system, the MCU receives the two-dimensional code data sent by the Android system, and makes the two-dimensional code payment safely and reliably in the low power consumption condition.

Figure 7:
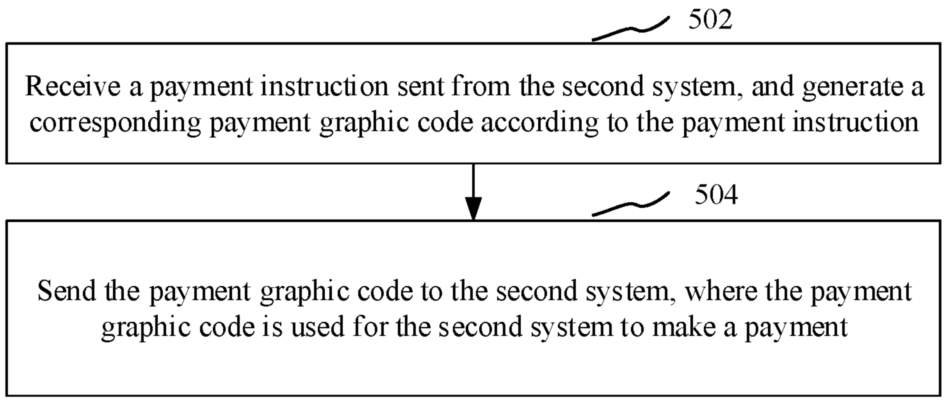
FIG. 7 is a flowchart of a payment method according to an embodiment.

In an embodiment, as illustrated in FIG. 7, a payment method is provided. The payment method is applied to a wearable device, where the wearable device includes a first processor and a second processor. The first processor is configured to run a first system, and the second processor is configured to run a second system. The wearable device is in a second system state, and power consumption of the second processor is lower than power consumption of the first processor. The method includes operations as follows.

Operation 502, a payment instruction sent from the second system is received, and a corresponding payment graphic code is generated according to the payment instruction.

Operation 504, the payment graphic code is sent to the second system, where the payment graphic code is used for the second system to make a payment.

In the embodiment, the wearable device includes a first processor and a second processor, where the first processor is configured to run a first system, and the second processor is configured to run a second system. The wearable device is in a second system state, and the power consumption of the second processor is lower than the power consumption of the first processor. A payment instruction sent from the second system is received, and a corresponding payment graphic code is generated according to the payment instruction. The payment graphic code is sent to the second system, where the payment graphic code is used for the second system to make a payment. The whole payment process is done in the second system state, and it is controlled by the low power consumption processor. The payment graphic code is received through the dual-core communication and is displayed, and the payment is made through the low-performance system. In this way, the payment function, which otherwise cannot be realized on the low-performance system, is enabled by means of the high-performance of the first system.

In an embodiment, operation 502 includes: entering a working state according to the payment instruction. And after operation 504, the method further includes: receiving response information returned by the second system, and entering the sleep state according to the response information.

In an embodiment, the method further includes: acquiring a user payment authorization instruction, when being in the working state; sending a payment preprocessing request to the second system according to the user payment authorization instruction, where the payment preprocessing request is used to instruct the second system to generate, based on an encryption algorithm, a public key and a private key corresponding to each other, and store the private key in the second system; and receiving the public key returned from the second system, and storing the public key.

In an embodiment, operation 502 includes: generating an encrypted payment graphic code which is encrypted with public key. Operation 504 includes: sending the encrypted payment graphic code to the second system.

In an embodiment, a downlink data packet is transmitted from the first processor to the second processor. The first processor transmitting the downlink data packet to the second processor includes: in response to detecting a downlink data packet, sending, by the first processor, a first master interrupt signal to the second processor; receiving, by the first processor, a first slave response signal returned, according to the first master interrupt signal, from the second processor; sending, by the first processor, the downlink data packet to the second processor according to the first slave response signal, and generating a second master interrupt signal after the sending is completed. The second master interrupt signal is used to instruct the second processor to generate a second slave response signal after processing of the downlink data packet is completed. In some embodiments, the second master interrupt signal may be obtained by resetting the first master interrupt signal, and the second slave response signal may be obtained by resetting the first slave response signal.

Specifically, the downlink data packet may include at least one of an operation instruction and service data that are received or generated by the first processor; for example, it may be a payment graphic code. The operation instruction may be used to instruct, after being transmitted to the second processor, the second processor to perform a corresponding service operation. The service data is used to provide, after being transmitted to the second processor, data support for the second processor to perform a service operation corresponding to the service data.

The first master interrupt signal is used to force an interruption and indicate that there is a downlink data packet needed to be transmitted from the first processor to the second processor. Specifically, upon detecting that there is a downlink data packet, the first processor of the wearable device may generate a corresponding first master interrupt signal according to the downlink data packet, and send the generated first master interrupt signal to the second processor through a master interrupt interface. The first slave response signal is used to indicate that the second processor is ready to receive the downlink data packet. Data transmission between the first processor and the second processor needs to be implemented through a data transmission interface.

The second master interrupt signal may indicate that the first processor has completed the transmission of data. After the transmission of the downlink data packet is completed, the first processor may generate the second master interrupt signal to notify the second processor that the transmission of the downlink data packet has been completed. The second processor receives the downlink data packet, and may process the downlink data packet. The second processor may generate the second slave response signal, after the second master interrupt signal is received and the processing of the downlink data packet is completed. The second processor may set a slave response interface to be a low level state. The second slave response signal is used to notify the first processor that the second processor has completed the processing of the downlink data packet. According to the second slave response signal, the first processor may send the first master interrupt signal again to the second processor to perform data transmission.

In the embodiment, when a downlink data packet is detected, the first processor may send a first master interrupt signal to the second processor, and receive a first slave response signal returned, according to the first master interrupt signal, from the second processor. The first processor may send the downlink data packet to the second processor according to the first slave response signal, and generate a second master interrupt signal after the sending is completed. The second master interrupt signal may instruct the second processor to generate a second slave response signal after completing the processing of the downlink data packet. That is, the data packet may be transmitted upon receipt of the first slave response signal, and the second master interrupt signal is generated after the transmission is completed, where the second master interrupt signal indicates that single data transmission has been completed. In this way, there is no need to introduce the slave interrupt signal and the master response signal for secondary confirmation, the delay of communication between the processors can be reduced, and the communication efficiency of the processors is improved.

It is understandable that, although the operations in the flowcharts of FIG. 2 to FIG. 4 and FIG. 6 to FIG. 7 are sequentially displayed according to indications of the arrows, these operations are not necessarily performed sequentially in the order indicated by the arrows. Unless specifically stated herein, the performance of these operations is not limited strictly by an order, and these operations may be performed in other orders. In addition, at least some of the operations in FIG. 2 to FIG. 4 and FIG. 6 to FIG. 7 may include multiple sub-operations or multiple phases, and these sub-operations or phases are not necessarily performed at the same moment, instead they may be performed at different moments; and these sub-operations or phases are not necessarily performed sequentially, instead they may be performed in turn or alternately with other operations or with at least part of the sub-operations or phases of other operations.

Figure 8:
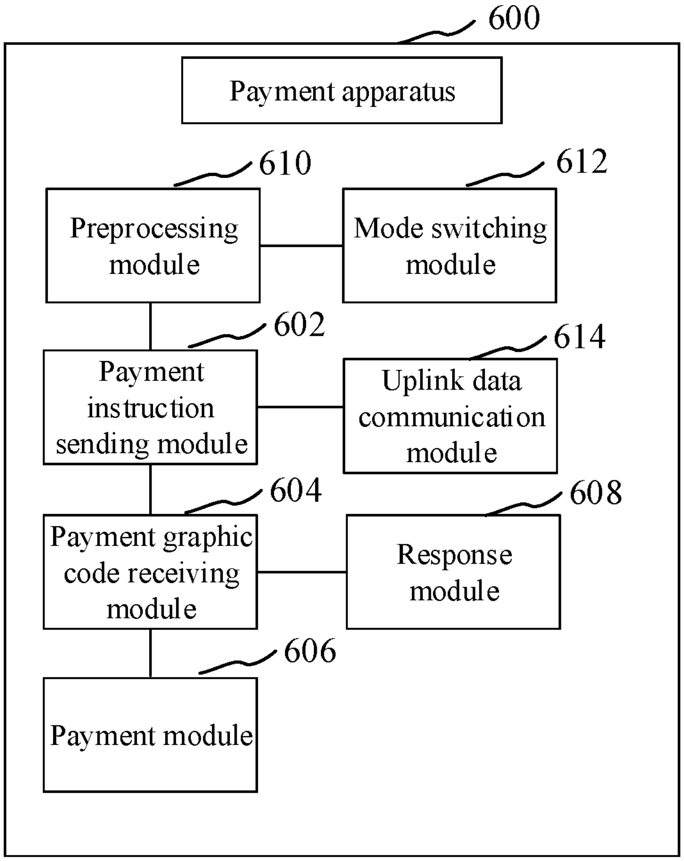
FIG. 8 is a structural block diagram of a payment apparatus according to an embodiment.

FIG. 8 is a structural block diagram illustrating a payment apparatus according to an embodiment. As illustrated in FIG. 8, a payment apparatus 600 is provided, which is applied to a wearable device. The wearable device includes a first processor and a second processor, the first processor is configured to run a first system, and the second processor is configured to run a second system. The wearable device is in a second system state, and power consumption of the second processor is lower than power consumption of the first processor. The apparatus includes a payment instruction sending module 602, a payment graphic code receiving module 604, a response module 608, and a payment module 606.

The payment instruction sending module 602 is configured to acquire a payment instruction, and send the payment instruction to the first system.

The payment graphic code receiving module 604 is configured to receive a payment graphic code returned, according to the payment instruction, from the first system.

The payment module 606 is configured to make a payment through the payment graphic code.

The foregoing payment apparatus makes the payment through the payment graphic code. The whole payment process is done in the second system state, and it is controlled by a low power consumption processor. The payment graphic code is received through dual-core communication and is displayed, and the payment is done through the low-performance system. In this way, the payment function, which otherwise cannot be realized on the low-performance system, is enabled by means of the high-performance of the first system.

In an embodiment, the payment instruction is configured to wake up the first system, to instruct the first system to generate, according to the payment instruction, a payment graphic code. And the apparatus further includes the response module 608.

The response module 608 is configured to return response information to the first system, where the response information is used to instruct the first system to enter a sleep state.

In the embodiment, the first system is woken up only when the payment graphic code needs to be generated, and the first system enters the sleep state after the payment graphic code is received. Thus, the power consumption of the first system is further reduced, and the payment is made under a lower power consumption condition, which improves the resource utilization.

In an embodiment, the response module 608 is further configured to perform verification on the payment graphic code, and generate the response information when the verification is passed.

In the embodiment, through the verification operation, the validity of the payment graphic code is improved, and payment failure is avoided. Only when the verification is passed, the response information is generated, which further ensures the reliability of the payment graphic code.

In an embodiment, the apparatus further includes:

a preprocessing module 610, configured to: receive a payment preprocessing request sent from the first system, where the payment preprocessing request is generated by the first system based on a user payment authorization instruction; according to the payment preprocessing request, generate, based on an encryption algorithm, a public key and a private key corresponding to each other; and store the private key in the second system, and send the public key to the first system for storage.

In the embodiment, after it is confirmed that the user allows to use the wearable device to pay through a graphic code, the first system instructs the second system to generate a public key and a private key based on an encryption algorithm, and send the public key to the first system through dual-core communication. The first system stores the public key after receiving it, and waits for a graphic code payment instruction sent from the second system. The security of subsequent transmission of the payment graphic code is ensured by generating the public key and the private key in advance, which improves the reliability of payment.

In an embodiment, the payment graphic code receiving module 604 is further configured to receive an encrypted payment graphic code that is encrypted by the first system with the public key; and decrypt the encrypted payment graphic code with the private key, to obtain the payment graphic code.

In the embodiment, the public key is transmitted to the first system from the second system, and the encrypted payment graphic code is transmitted to the second system from the first system. In this case, even if both of the encrypted payment graphic code and the public key are intercepted by a hacker, there is no danger, because only the private key of the second system can decrypt the message, thereby preventing leakage of contents of the message.

In an embodiment, the payment module 606 is further configured to transfer the payment graphic code to a user interface, and display the payment graphic code on the user interface.

In the embodiment, in the second system state, the payment graphic code may be displayed through the low-performance system, which ensures the use of the payment function of the wearable device under the low-performance system, and reduces the power consumption of the wearable device.

In an embodiment, the device further includes:

a mode switching module 612, configured to detect an operating state of the wearable device; and when the operating state meets a low power consumption condition, switch the wearable device to operate in the second system state, and control the first system to enter the sleep state.

In the embodiment, the operating state of the wearable device is automatically detected; and upon determining that the operating state meets the low power consumption condition, the wearable device is automatically switched to operate in the second system state, and the first system is controlled to enter the sleep state, thereby reducing the power consumption.

In an embodiment, an uplink data packet is transmitted from the second processor to the first processor, and the apparatus further includes:

an uplink data communication module 614, configured to: send a first slave interrupt signal to the first processor, to cause the first processor to send a first master response signal and read the uplink data packet from the second processor, according to the first slave interrupt signal; and after transmission of the uplink data packet is completed, send a second slave interrupt signal to the first processor, to cause the first processor to generate, according to the second slave interrupt signal, a second master response signal after the reading of the uplink data packet is completed.

In the embodiment, the first processor may read the data packet upon receiving the first slave interrupt signal; and after the reading of data is completed, the first processor may generate the second master response signal according to the second slave interrupt signal that is generated by the second processor, where the second master response signal indicates that single data transmission has been completed. This reduces the delay of communication between the processors, and improves the communication efficiency of the processors.

Figure 9:
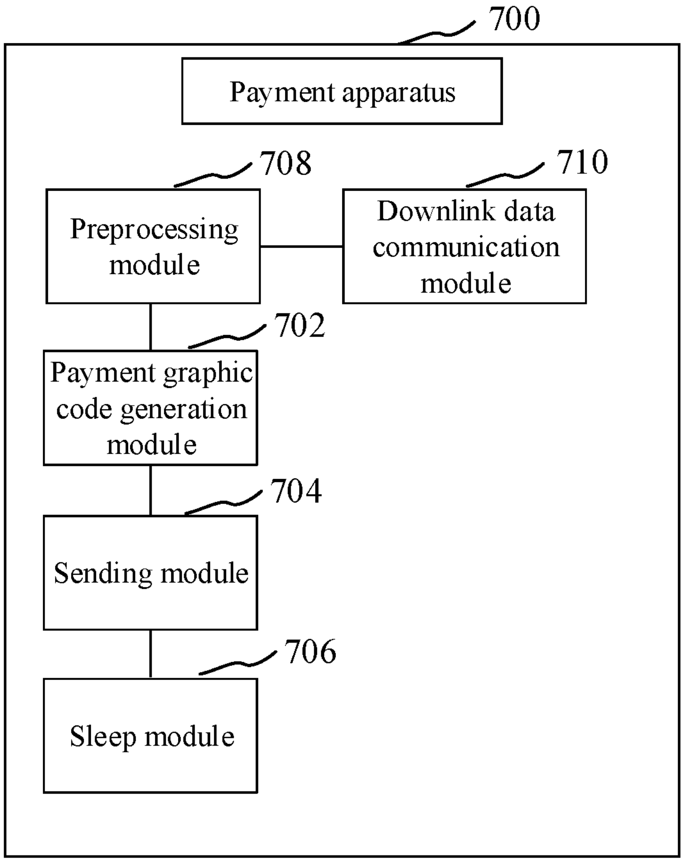
FIG. 9 is a structural block diagram of a payment apparatus according to another embodiment.

FIG. 9 is a structural block diagram of a payment apparatus of an embodiment. As illustrated in FIG. 9, a payment apparatus 700 is provided, which is applied to a wearable device. The wearable device includes a first processor and a second processor, the first processor is configured to run a first system, and the second processor is configured to run a second system. The wearable device is in a second system state, and power consumption of the second processor is lower than power consumption of the first processor. The apparatus includes a payment graphic code generation module 702 and a sending module 704.

The payment graphic code generation module 702 is configured to receive a payment instruction sent from the second system, and generate a corresponding payment graphic code according to the payment instruction.

The sending module 704 is configured to send the payment graphic code to the second system, where the payment graphic code is used for the second system to make a payment.

In the embodiment, the whole payment process is done in the second system state, and it is controlled by the low power consumption processor. The payment graphic code is received through the dual-core communication and is displayed, and the payment is made through the low-performance system. In this way, the payment function, which otherwise cannot be realized on the low-performance system, is enabled by means of the high-performance of the first system.

In an embodiment, the payment graphic code generation module 702 is further configured to make a working state entered according to the payment instruction. The apparatus further includes a sleep module 706, configured to receive response information returned from the second system, and make the sleep state entered according to the response information.

In the embodiment, the first system is woken up only when the payment graphic code needs to be generated, and the first system enters the sleep state after the payment graphic code is received. Thus, the power consumption of the first system is further reduced, and the payment is made under a lower power consumption condition, which improves the resource utilization.

In an embodiment, the apparatus further includes:

a preprocessing module 708, configured to: acquire a user payment authorization instruction when being in the working state; send a payment preprocessing request to the second system according to the user payment authorization instruction, where the payment preprocessing request is used to instruct the second system to generate, based on an encryption algorithm, a public key and a private key corresponding to each other and store the private key in the second system; and receive the public key returned from the second system, and store the public key.

In the embodiment, after it is confirmed that the user allows to use the wearable device to pay through a graphic code, the first system instructs the second system to generate a public key and a private key based on an encryption algorithm, and send the public key to the first system through dual-core communication. The first system stores the public key after receiving it, and waits for a graphic code payment instruction sent from the second system. The security of subsequent transmission of the payment graphic code is ensured by generating the public key and the private key in advance, which improves the reliability of payment.

In an embodiment, the payment graphic code generation module 702 is further configured to generate an encrypted payment graphic code which is encrypted based on the public key. The sending module 704 is further configured to send the encrypted payment graphic code to the second system.

In the embodiment, the public key is transmitted to the first system from the second system, and the encrypted payment graphic code is transmitted to the second system from the first system. In this case, even if both of the encrypted payment graphic code and the public key are intercepted by a hacker, there is no danger, because only the private key of the second system can decrypt the message, thereby preventing leakage of contents of the message.

In an embodiment, a downlink data packet is transmitted from the first processor to the second processor, and the apparatus further includes:

a downlink data communication module 710, configured to: send, a first master interrupt signal to the second processor when a downlink data packet is detected; receive a first slave response signal that is returned from the second processor according to the first master interrupt signal; send the downlink data packet to the second processor according to the first slave response signal; and generate a second master interrupt signal after the sending is completed. The second master interrupt signal is used to instruct the second processor to generate a second slave response signal after processing of the downlink data packet is completed.

In the embodiment, when a downlink data packet is detected, the first processor may send a first master interrupt signal to the second processor, and receive a first slave response signal returned, according to the first master interrupt signal, from the second processor. The first processor may send the downlink data packet to the second processor according to the first slave response signal, and generate a second master interrupt signal after the sending is completed. The second master interrupt signal may instruct the second processor to generate a second slave response signal after completing the processing of the downlink data packet. That is, the data packet may be transmitted upon receipt of the first slave response signal, and the second master interrupt signal is generated after the transmission is completed, where the second master interrupt signal indicates that single data transmission has been completed. In this way, there is no need to introduce the slave interrupt signal and the master response signal for secondary confirmation, the delay of communication between the processors can be reduced, and the communication efficiency of the processors is improved.

The division of various modules in the payment apparatus mentioned above is only illustrative. In other embodiments, the payment apparatus may be divided into different modules as required, to implement all or part of the functions of the payment apparatus mentioned above.

For the specific definitions of the payment apparatus, reference may be made to the definitions of the payment method in the foregoing, and details thereof are not repeated herein. The various modules in the payment apparatus mentioned above may be implemented completely or partly in software, hardware, and a combination thereof. The foregoing modules may be in a hardware form, and embedded in or independent of a processor in a computer device; or they may be in a form of software and stored in a memory in the computer device, so that the processor invokes and executes the operations corresponding to the foregoing modules.

Figure 10:
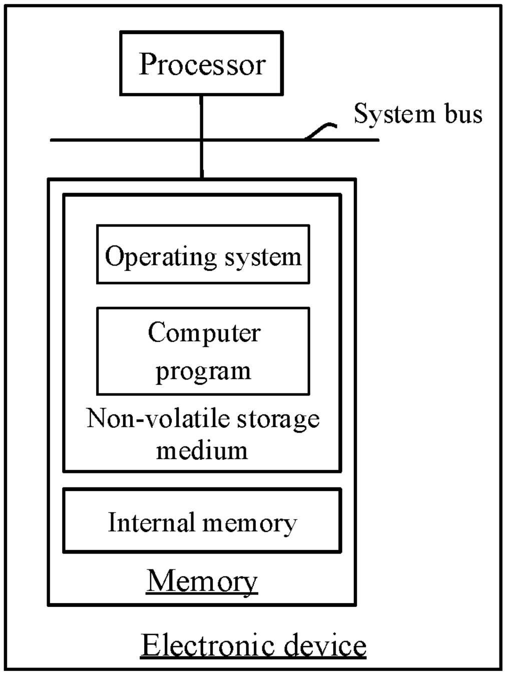
FIG. 10 is a schematic diagram illustrating an internal structure of an electronic device according to an embodiment.

FIG. 10 is a schematic diagram illustrating an internal structure of an electronic device according to an embodiment. As illustrated in FIG. 10, the electronic device includes a processor and a memory connected by a system bus. The processor is configured to provide calculation and control capabilities to support operations of the entire electronic device. The memory may include a non-volatile storage medium and an internal memory. The non-volatile storage medium stores an operating system and a computer program. The computer program may be executed by the processor to implement the payment method provided in the foregoing embodiments. The internal memory provides a cached operating environment for the operating system and the computer program in the non-volatile storage medium. The electronic device may be various wearable devices.

The various modules in the payment apparatuses provided in the embodiments of the present disclosure may be implemented in the form of a computer program. The computer program may run on a terminal or a server. Program modules defined by the computer program may be stored in a memory of the electronic device. When the computer program is executed by a processor, operations of the method described in the embodiments of the present disclosure are implemented.

The embodiments of the present disclosure further provide a computer-readable storage medium. One or more non-transitory computer-readable storage media contain computer-executable instructions, and when being executed by one or more processors, the computer-executable instructions cause the processor(s) to perform operations of the payment methods.

A computer program product including instructions which, when being executed on a computer, cause the computer to perform the payment methods.

The memory, storage, database, or any other referred media as used herein may include a non-volatile and/or volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM), which functions as an external cache memory. By way of illustration and not limitation, the RAM is available in many forms, such as static RAM (SRAM), dynamic RAM (DRAM), synchronous DRAM (SDRAM), double data rate SDRAM (DDR SDRAM), enhanced SDRAM (ESDRAM), Synch link (Synch link) DRAM (SLDRAM), Rambus direct RAM (RDRAM), direct Rambus dynamic RAM (DRDRAM), and Rambus dynamic RAM (RDRAM).

The foregoing embodiments only illustrate several implementations of the present disclosure, and their descriptions are relatively specific and detailed, but they should not be construed as limiting the scope of the present disclosure. It is notable for those skilled in the art that, several variations and improvements may be made without departing from the concept of the present disclosure, which all fall within the protection scope of the present disclosure. Accordingly, the protection scope of the present disclosure are defined by the appended claims.

What is claimed is:

1. A payment method, for a wearable device, wherein the wearable device comprises a first processor and a second processor, the first processor is configured to run a first system, the second processor is configured to run a second system, power consumption of the second processor is lower than power consumption of the first processor, power consumption of running of the first system is higher than power consumption of running the second system, and the method comprises:

in a second system state in which running of the wearable device is controlled under the second system, sending, by the second system, a payment instruction to the first system;

generating, by the first system, a payment graphic code according to the payment instruction, and returning the payment graphic code to the second system;

transferring, by the second system, the payment graphic code received from the first system to a user interface; and displaying, by the second system, the payment graphic code on the user interface.

2. The method of claim 1, wherein after the payment instruction is sent to the first system and before the payment graphic code is returned to the second system, the method further comprises: waking up the first system to generate, according to the payment instruction, the payment graphic code, and after the second system receives the payment graphic code returned, according to the payment instruction, from the first system, the method further comprises:

returning, by the second system, response information to the first system, wherein the response information is configured to instruct the first system to enter a sleep state; and the first system entering the sleep state in response to the response information.

3. The method of claim 2, the method comprises:

performing, by the second system, verification on the payment graphic code, and generating the response information based on a determination that the verification is passed.

4. The method of claim 1, wherein before sending the payment instruction, the method further comprises:

receiving, by the second system, a payment preprocessing request sent from the first system, wherein the payment preprocessing request is generated by the first system according to a user payment authorization instruction;

generating, by the second system according to the payment preprocessing request and based on an encryption algorithm, a public key and a private key corresponding to each other, and storing the private key in the second system; and sending, by the second system, the public key to the first system for storage.

5. The method of claim 4, wherein generating, by the first system, the payment graphic code according to the payment instruction, and returning the payment graphic code to the second system, comprises:

generating, by the first system according to the payment instruction, an encrypted payment graphic code with the public key, and returning the encrypted payment graphic code to the second system; and before the making, by the second system, a payment through the received payment graphic code, the method further comprises:

receiving, by the second system, the encrypted payment graphic code that is encrypted by the first system according to the public key; and decrypting, by the second system, the encrypted payment graphic code according to the private key, to obtain the payment graphic code.

6. The method of claim 1, wherein the method further comprises:

detecting an operating state of the wearable device; and in response to determining that the operating state meets a low power consumption condition, switching the wearable device to operate in the second system state, and controlling the first system to enter a sleep state.

7. The method of claim 6, wherein determining that the operating state meets the low power consumption condition comprises:

determining that the low power consumption condition is met, in response to detecting at least one of a low power state of the wearable device, an abnormal temperature state of the wearable device, a state where a motion speed of the wearable device is greater than a preset threshold, and a state where a heart rate of a user of the wearable device is lower than a preset threshold.

8. The method of claim 6, wherein determining that the operating state meets the low power consumption condition comprises:

acquiring a state vector, based on at least one device state of the wearable device and at least one user state of a user of the wearable device; and determining that the low power consumption condition is met, in response to determining that the acquired state vector matches a standard state vector corresponding to the low power consumption condition.

9. The method of claim 2, wherein an uplink data packet is transmitted from the second system to the first system, the uplink data packet comprises at least one of the payment instruction and the response information, and the second system transmitting the uplink data packet to the first system comprises:

sending, by the second system, a first slave interrupt signal to the first system;

sending, by the first system, a first master response signal to the second system and reading the uplink data packet from the second system, according to the first slave interrupt signal;

sending, by the second system, a second slave interrupt signal to the first system, after transmission of the uplink data packet is completed; and generating, by the first system according to the second slave interrupt signal, a second master response signal after reading of the uplink data packet is completed.

10. The method of claim 1, wherein a downlink data packet is transmitted from the first system to the second system, the downlink data packet comprises at least the payment graphic code, and the first system transmitting the downlink data packet to the second system comprises:

sending, by the first system, a first master interrupt signal to the second system, in response to detecting the downlink data packet;

sending, by the second system, to the first system a first slave response signal according to the first master interrupt signal;

sending, by the first system, the downlink data packet to the second processor according to the first slave response signal, and generating a second master interrupt signal after the sending of the downlink data packet is completed; and generating, by the second system according to the second master interrupt signal, a second slave response signal after processing of the downlink data packet is completed.

11. The method of claim 1, wherein the payment graphic code is a graphic code carrying payment information, and the payment information comprises a payment account identifier, payment user's identity information, timestamp information, and payment running number.

12. The method of claim 3, further comprising:

returning, by the second system, a re-transmission notification to the first system based on a determination that the verification is failed, and regenerating, by the first system according to the re-transmission notification, the payment graphic code and returning the regenerated payment graphic code to the second system.

13. The method of claim 12, wherein the re-transmission notification carries a current time, and the regenerating, by the first system, the payment graphic code comprises:

regenerating, by the first system, an updated payment graphic code according to the current time.

14. An electronic device, comprising:

a first processor configured to run a first system and a second processor configured to run a second system, power consumption of the second processor is lower than power consumption of the first processor, and power consumption required by running of the second system being lower than power consumption required by running of the first system; and a memory, wherein the memory stores therein a computer program which, when being executed by the first processor and the second processor, causes the first processor and the second processor to:

when the electronic device is in a second system state in which running of the electronic device is controlled under the second system, send, by the second system, a payment instruction to the first system;

generate, by the first system, a payment graphic code based on the payment instruction received from the second system, and return the payment graphic code to the second system;

transfer, by the second system, the payment graphic code received from the first system to a user interface; and display, by the second system, the payment graphic code on the user interface.

15. The electronic device of claim 14, wherein the computer program, when being executed by the first processor and the second processor, further causes the first processor to:

control the first system to enter a working state and generate, according to the payment instruction, the payment graphic code.

16. The electronic device of claim 15, wherein the computer program, when being executed by the first processor and the second processor, further causes the first processor and the second processor to:

send, by the second system, response information to the first system, after the payment graphic code is received from the first system; and control the first system to enter a sleep state based on the response information.

17. The electronic device of claim 16, wherein the computer program, when being executed by the first processor and the second processor, further causes the second processor to:

perform, by the second system, verification on the payment graphic code, and generate the response information based on a determination that the verification is passed.

18. The electronic device of claim 14, wherein the computer program, when being executed by the first processor and the second processor, further causes the first processor and the second processor to:

send, by the first system, a payment preprocessing request to the second system, wherein the payment preprocessing request is generated by the first system according to a user payment authorization instruction;

generate, by the second system according to the payment preprocessing request and based on an encryption algorithm, a public key and a private key corresponding to each other, and storing the private key in the second system; and send, by the second system, the public key to the first system for storage.

19. A non-transitory computer-readable storage medium storing a computer program thereon, wherein the computer program is configured to be executed by at least one processor of an electronic device, the at least one processor comprises a first processor configured to run a first system and a second processor configured to run a second system thereon, power consumption of the second processor is lower than power consumption of the first processor, power consumption required by running of the second system being lower than power consumption required by running of the first system, the computer program, when being executed by the first processor and the second processor, causes the first processor and the second processor to:

when the electronic device is in a second system state in which running of the electronic device is controlled under the second system, send, by the second system, an acquired payment instruction to the first system;

generate, by the first system, a payment graphic code in response to receiving the payment instruction, and send the payment graphic code to the second system;

transfer, by the second system, the payment graphic code received from the first system to a user interface; and display, by the second system, the payment graphic code on the user interface.

20. The non-transitory computer-readable storage medium of claim 19, wherein after the payment instruction is sent to the first system and before the payment graphic code is returned to the second system, the computer program, when being executed by the first processor and the second processor, further causes the first processor and the second processor to:

in the second system state, wake up the first system from a sleep state, and generate, by the first system, the payment graphic code; and after the second system receives the payment graphic code, the computer program, when being executed by the first processor and the second processor, further causes the first processor and the second processor to:

in the second system state, perform, by the second system, verification on the payment graphic code, generate response information based on a determination that the verification is passed, return, by the second system, response information to the first system, and control the first system to enter the sleep state in response to the response information.

* * * * *